United States Patent [19]

Ogawa

[11] Patent Number: 4,972,919

[45] Date of Patent: Nov. 27, 1990

[54] AUTOMATIC VEHICLE CRUISE CONTROL SYSTEM

[75] Inventor: Kenichi Ogawa, Aichi, Japan

[73] Assignee: Aisin Seiki Kabushiki Kaisha, Aichi, Japan

[21] Appl. No.: 337,811

[22] Filed: Apr. 14, 1989

[30] Foreign Application Priority Data

Apr. 14, 1988 [JP] Japan ................................ 63-91944

[51] Int. Cl.$^5$ ............................................ B60K 31/02
[52] U.S. Cl. ..................................... 180/179; 123/361; 364/426.04
[58] Field of Search ............... 180/179, 178, 177, 176; 364/426.04; 123/361

[56] References Cited

U.S. PATENT DOCUMENTS

| | | | |
|---|---|---|---|
| 4,385,675 | 5/1983 | Blee | 180/178 |
| 4,763,746 | 8/1988 | Ochiai | 180/179 |
| 4,821,831 | 4/1989 | Onishi | 180/178 |
| 4,845,621 | 7/1989 | Kawata et al. | 180/179 |

*Primary Examiner*—David M. Mitchell

*Attorney, Agent, or Firm*—Sughrue, Mion, Zinn, Macpeak & Seas

[57] ABSTRACT

An automatic vehicle cruise control system is comprised of a vehicle-speed determining device movable between an upper limit for a high speed operation of the vehicle and a lower limit for a low speed operation of the vehicle, a motor for moving the vehicle-speed determining device, a speed-detecting device for detecting the actual speed of the vehicle, a target-setting device for setting the required speed of the vehicle, a motor driving device for driving the motor in such a manner that the actual speed can be equalized to the required speed, a main switch interposed between a battery and the motor driving device, a switch-detecting device for detecting the opening of the main switch, a switching device for assuring an electrical connection between the battery and the motor driving device and a control device for activating the switching device after the closure of the main switch and deactivating the switching device after moving the vehicle-speed determining device to its lower limit via the motor upon detection of the opening of the main switch by the switch-detecting device.

5 Claims, 5 Drawing Sheets

AUTOMATIC VEHICLE CRUISE CONTROL SYSTEM

BACKGROUND OF THE INVENTION

1. Field of the Invention

The present invention relates to an automatic vehicle cruise control system and in particular to an automatic vehicle cruise control system in which a throttle valve opening rate is controlled for maintaining the vehicle-speed at a constant value.

2. Description of the Prior Art

A conventional automatic vehicle cruise control system of this type is disclosed in Japanese Patent Publication No. 60-58046 issued on Dec. 18, 1985. In this system, an electromagnetically operated clutch means is interposed between a throttle valve and a motor for driving the throttle valve. When the clutch means malfunctions due to an unexpected problem, a control circuit will operate the motor so as to decrease the opening rate of the throttle valve.

However, if a driver turns off the main switch of the automatic vehicle cruise control system immediately upon recognition of the trouble therein, the opening of the throttle valve to be reduced is fixed as it is so that the vehicle-speed cannot be lowered.

SUMMARY OF THE INVENTION

It is therefore a principal object of the present invention to provide an automatic vehicle cruise control system without the aforementioned drawback.

Another object of the present invention is to provide an automatic vehicle cruise control system with a fail-safe function.

According to the present invention, an automatic vehicle cruise control system is comprised of vehicle-speed determining means movable between an upper limit for a high speed operation of the vehicle and a lower limit for a low speed operation of the vehicle, motor means for moving the vehicle-speed determining means, speed-detecting means for detecting the actual speed of the vehicle, target-setting means for setting the required speed of the vehicle, motor driving means for driving the motor means in such a manner that the actual speed can be equalized to the required speed, a main switch interposed between battery means and the motor driving means, switch-detecting means for detecting the opening of the main switch, switching means for assuring an electrical connection between the battery means and the motor driving means and control means activating the switching means after the closure of the main switch and deactivating switching means after moving the vehicle-speed determining means to its lower limit via the motor means upon detection of the opening of the main switch by the switch-detecting means.

The foregoing and other objects, features and advantages of the present invention will become apparent and more readily appreciated from the following detailed description of preferred exemplary embodiment of the invention, taken in connection with the accompanying drawings, in which.

DETAILED DESCRIPTION OF THE PREFERRED EMBODIMENT

Figure 1:
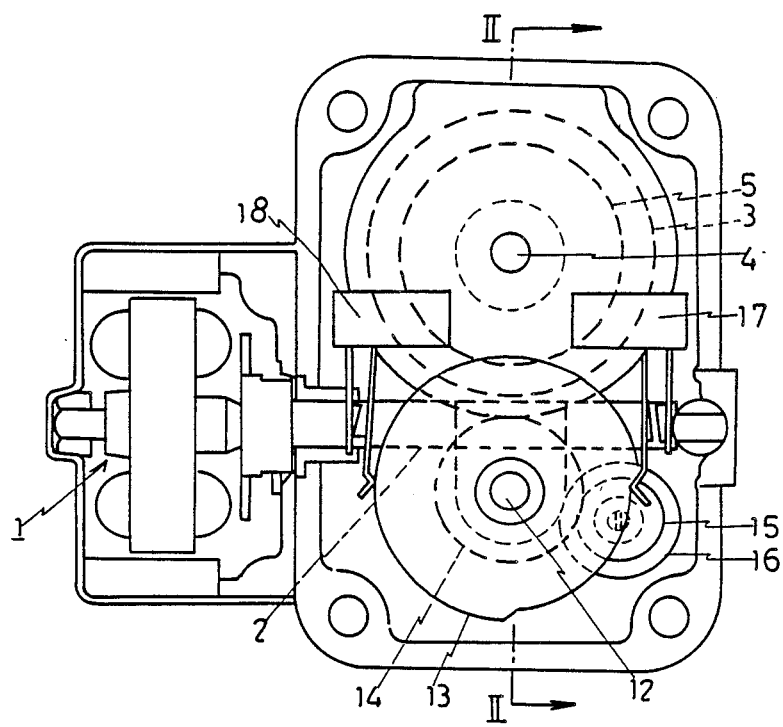
FIG. 1 is a cross-sectional view of the mechanical portion of an automatic vehicle cruise control system.
Figure 2:
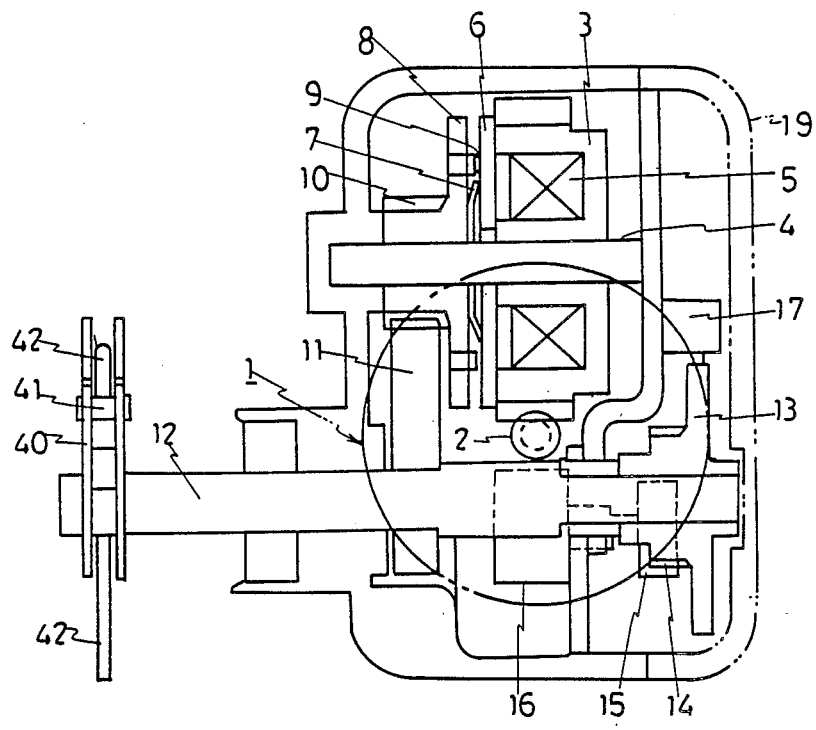
FIG. 2 is a cross-sectional view taken along line II—II in FIG. 1.
Figure 3:
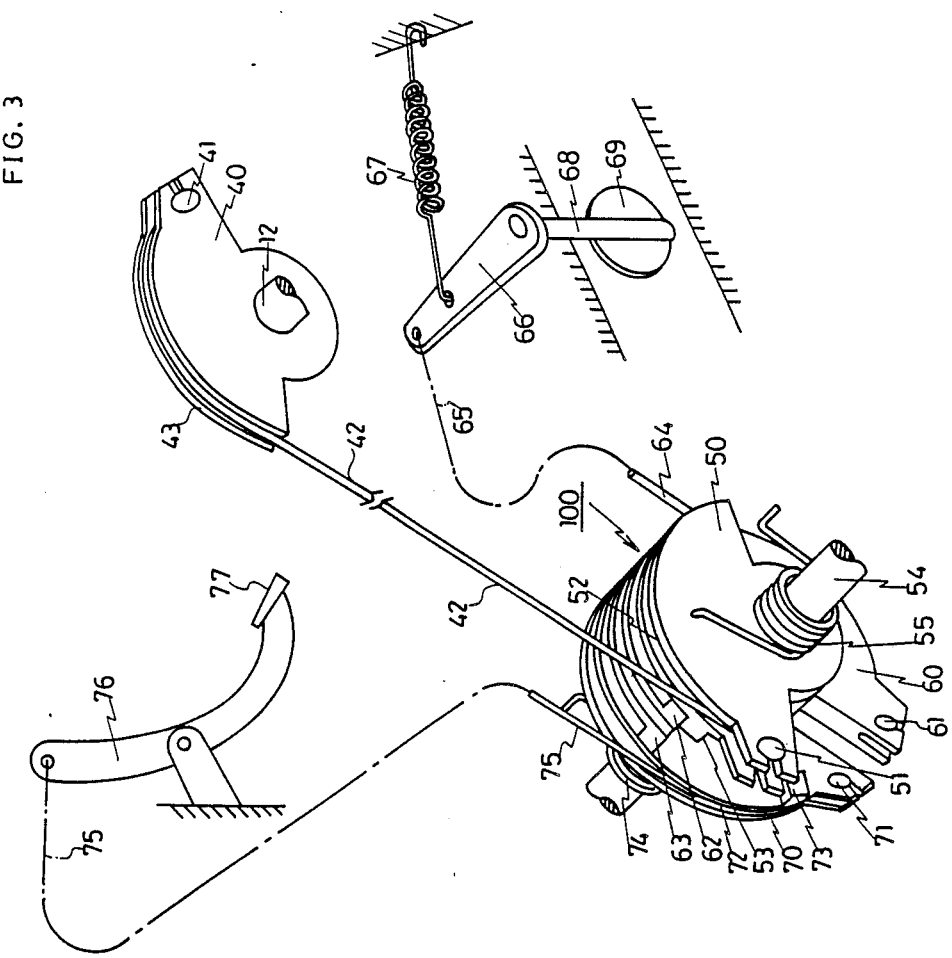
FIG. 3 is a perspective view of a connecting portion.

Referring now to FIGS. 1 through 3, an output shaft 12 is operatively connected to a throttle valve 69 via a connecting means 100. On the output shaft 12, there is fixedly mounted a sector-gear 11. The sector-gear 11 is in meshing engagement with a gear portion 10 on a clutch-driven gear 8 which is rotatably mounted on a stationary shaft 4. The clutch-driven gear 8 is made of magnetic material and has an annular plate with an axial projection 9. An annular plate 6 made of nonmagnetic material is opposed to the annular plate of the clutch-driven gear 8 with a leaf spring 7 interposed therebetween. The annular plate 6 has a hole for receiving therein the projection 9 and is secured to a clutch-driven gear 3. The clutch-driven gear 3 is made of magnetic material and is fixedly mounted on the shaft 4. Within the clutch-driven gear 3, there is provided an electrical coil 5.

Upon energization of the coil 5, clutch-driven gear 8 is attracted to the clutch-driven gear 3, resulting in the engagement of the projection 9 in the hole in the plate 6. This condition is defined as a clutch-on condition. On the other hand, upon deenergization of the coil 5, the projection 9 is extracted from the hole due to the resilient force of the leaf spring 7. This condition is defined as a clutch-off condition.

The clutch-driven gear 3 is in meshing engagement with a worm-shaft 2 to which a shaft of a motor 1 is connected. Upon driving of the motor 1, the worm-shaft 2 and the clutch-driven gear 3 are rotated.

On one end portion of the output shaft 12, there is fixedly mounted a cam-plate 13 having a periphery on which operating levers of limit switches 17 and 18 are slidingly engaged. The limit switch 17 is moved from the closed condition to the opened condition when the rotating angle of the output shaft 12 exceeds a set value corresponding to the maximum opening of the throttle valve when the output shaft 12 is rotated in the direction of the opening of the throttle valve 69. The limit switch 18 is moved from the closed condition to the opened condition when the rotating angle of the output shaft 12 reaches a set value corresponding to the idle position of the throttle valve opening when the output shaft 12 is rotated in the direction of the closing of the throttle valve 69.

A gear portion 14 is in meshing engagement with a gear 15 to which a potentiometer 16 is connected. The output of the potentiometer 16 represents the rotating angle of the output shaft 12.

A sector-cam 40 is secured to the output shaft 12. A groove 43 for guiding a wire 42 is formed on a periphery of the sector-cam 40. One end of the wire 42 is secured to the sector-cam 40 by a pin 41. When the output shaft 12 is rotated in the clockwise direction in FIG. 3, the wire 42 is pulled toward the sector-cam 40 rotating in the same direction.

FIG. 3 is a perspective illustration of the connecting means 100 which is disposed between the throttle valve 69 and the output shaft 12. The other end of the wire 42 is secured to a first sector-cam 50 in the connecting means 100 by a pin 51. The sector-cam 50 is rotatably mounted on a stationary shaft 54 and is urged by a coil-spring 55 in the counter-clockwise direction. The opposite ends of the coil-spring 55 are respectively in engagement with the sector-cam 50 and a frame (not shown) of the connecting means 100.

In addition to the first sector-cam 50, a second sector-cam 60 and a third sector-cam 70 are disposed in parallel adjacent thereto. The second sector-cam 60 and the third sector-cam 70 are rotatably mounted on the stationary shaft 54. The third sector-cam 70 is also urged by a coil-spring 74 in the counter-clockwise direction. The opposite ends of the coil-spring 74 are respectively in engagement with the sector-cam 70 and a frame (not shown) of the connecting means 100.

One end of a wire 64 whose other end 65 is connected to a throttle valve drive lever 66 is connected to the second sector-cam 60 by a pin 61. One end of a wire 75 whose other end is connected to a foot portion 76 of an accelerator pedal 77 is connected to the third sector-cam 70 by a pin 71.

These three sector-cams 50, 60 and 70 are similar to the sector-cam 40 in construction except that the first sector-cam 50 has a projection 53, the third sector-cam 70 has also a projection 73 and the second sector-cam 60 has projections 62 and 63 with which the projections 53 and 73 are respectively engageable.

FIG. 3 shows a condition under which the accelerator pedal 77 is released or is not depressed and the output shaft 12 is rotated to an upper limit (FIG. 1) corresponding to the maximum opening of the throttle valve. Although the second sector-cam 60 is urged to be rotated in the counter-clockwise due to the pulling force of a coil spring 67 which acts on the throttle valve drive lever 66 in the closed direction of the throttle valve 69, the clockwise rotation of the first sector-cam 50 due to the rotation of the output shaft 12 causes engagement of the projection 53 of the first sector-cam 50 with the projection 62 of the second sector-cam 60. Thus, the second sector-cam 60 is rotated toward the above-mentioned position against the pulling force of the coil-spring 67.

Under this condition, upon rotation of the output shaft 12 toward a lower limit position thereof, the sector-cam 40 is rotated in the counter-clockwise direction, thereby feeding the wire 42 out. This means that the pulling force applied to the wire 42 disappears. Despite the counter-clockwise rotation of the first sector-cam 50 due to the repulsion force of the coil-spring 55, the counter-clockwise rotation of the second sector-cam 60 due to the pulling force of the spring 67 causes the unitary rotation of the first and second sector-cams 50 and 60 as the output shaft 12 rotates in the counter-clockwise direction towards the lower limit position thereof. During this rotation, the engagement between the projections 53 and 62 is not released. That is to say, upon the release of the accelerator pedal 77, due to the rotation of the output shaft 12 toward the upper limit thereof, the first and the second sector-cams 50 and 60 are rotated in the clockwise direction, thereby increasing the opening of the throttle valve 69. Due to the rotation of the output shaft 12 toward the lower limit thereof, the first and the second sector-cams 50 and 60 are rotated in the counter-clockwise direction, thereby decreasing the opening of the throttle valve 69.

As shown in FIG. 3, upon depression of the accelerator pedal 77 while the output shaft 12 changes the opening of the throttle valve 69 to the maximum opening, the third sector-cam 70 is rotated in the clockwise direction. However, except for the full depression of the accelerator pedal 77, the projection 73 cannot abut the projection 63. In other words, when the accelerator pedal 77 is moved between the released position corresponding to the idling condition of the opening of the throttle valve 69 and the maximum condition of the opening of the throttle valve 69, the third sector-cam 70 is rotated in both directions. However, since the rotation of the throttle valve 69 is restricted by the output shaft 12, the degree of depression of the accelerator pedal 77 has no relationship to the opening of the throttle valve 69.

During return rotation of the output shaft 12 from the upper limit corresponding to the maximum opening rate of the throttle valve 69 (FIG. 3) to the lower limit corresponding to the idling condition of the opening of the throttle valve 69, the opening of the throttle valve 69 reaches the idling condition when the accelerator pedal 77 is released. Under similar conditions, when the accelerator pedal 77 is depressed halfway, the output shaft 12 is rotated to the lower limit position thereof. However, since the engagement of the projection 63 and the projection 73 stops the counter-clockwise rotation of the second sector-cam 60, opening of the throttle valve 69 is at an intermediate position.

In summary, after the output shaft 12 is rotated toward its lower limit position, the opening rate of the throttle valve 69 depends on the degree of depression of the accelerator pedal 77. Thus, under this condition, the control for setting the vehicle speed can be performed by depressing or releasing the accelerator pedal 77.

Figure 4:
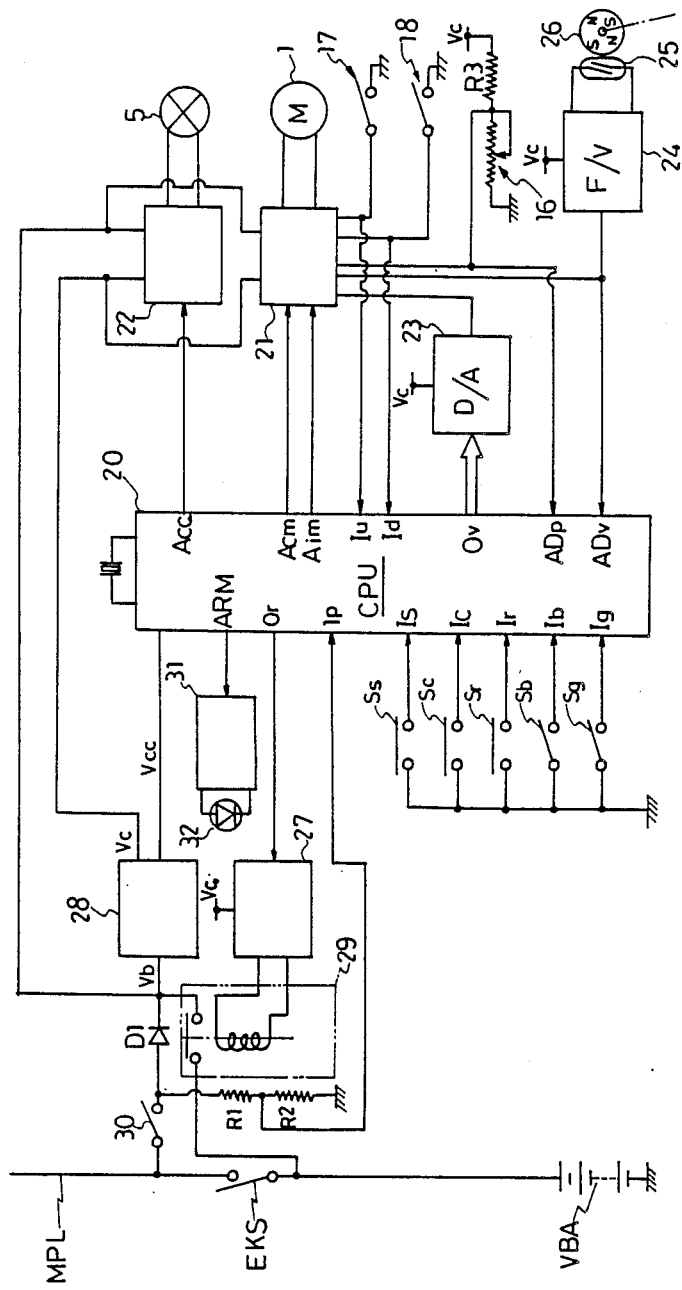
FIG. 4 is a circuit diagram of the automatic vehicle cruise control system.

Referring to FIG. 4, the motor 1 is under the control of the motor driver 21 which is in the form of the servo-circuit so as to be driven in the positive or negative direction according to the condition of the limit switches 17 and 18.

When signals from terminals Acm and Aim of a micro-processor 20 are High and Low with respect to the motor driver 21, the motor driver 21 begins to drive the motor 1 so that an output of a F/V converter 23 which denotes the analogue voltage corresponding to the required speed of the vehicle. The rotation of the motor 1 depends on the mutual relation between the deviation of the two analogue voltages, the output voltage of the potentiometer 16 which corresponds to the opening of the throttle valve 69 and the current applied to the motor 1.

When both signals at Acm and Aim are Highs or upon initial positioning, the motor driver 21 drives the motor 1 so that the output voltage of the potentiometer 16 which corresponds to the rotating angle of the output shaft 12 may be equalized to the output voltage of the D/A converter 23 which corresponds to the required angle of the output shaft 12.

When the signal Acm from the micro-processor is Low, the motor driver 21 does not drive the motor 1.

The coil 5 is under the control of a solenoid driver 22. When a signal from the micro-processor 20 to the solenoid driver 22 is High (Low), the solenoid driver 22 energizes (deenergizes) the coil 5 so as to obtain the clutch-on (clutch-off) condition.

A power-supply 28 is connected via a main switch 30 to a main power line MPL to which a battery VBA is connected via an engine-key switch EKS and supplies constant voltages Vc and Vcc to plural circuits which belong to this system.

Between the battery VBA and the power supply 28, there is interposed a relay 29 which is under the control of the relay-driver 27. When a high (low) signal is applied from the micro-processor 20, the relay-driver 27 activates (deactivates) the relay 29. For detecting the conditions of the main switch 30 and the key switch EKS, two serially connected registers R1 and R2 are available. When the two switches are turned on (either of the switches is turned off), a high (low) signal is supplied to the micro-processor 20.

To the micro-processor 20, there are connected a set switch Ss which activates the cruise control at a constant speed, a cancel switch Sc which cancels the activation of the cruise control at a constant speed, a resume switch Sr which revives the activation of the cruise control at a constant speed after cancellation thereof, a brake switch Sb which is turned on by depression of the brake pedal for indicating the deactivation of the cruise control at a constant speed and a clutch switch Sg to be turned on upon clutch disengagement before transmission operation for indicating the deactivation of the cruise control at constant speed.

A rotor 26 in the form of the permanent magnet is connected to the speedometer cable. A leaf switch 25 which is turned on/off sequentially during one rotation of the rotor 26 is connected to a F/V converter 24. The F/V converter 24 generates a voltage which is in inverse proportion to the cycle of turning the switch 25 on/off for showing the actual speed of the vehicle and the resulting voltage is applied to the motor driver 21 and a terminal ADv of the micro-processor 20.

The output voltage of the potentiometer 16 corresponding to the rotating angle of the output shaft 12 is supplied to the terminal ADv of the microprocessor 20.

A luminescent diode 32 acting as a warning lamp is connected to a lamp-driver 31. When a high (low) signal is applied to the lamp-driver 31, it activates (deactivates) the luminescent diode 32 for the illumination (non-illumination) thereof.

Since the current to be supplied to the coil 5 and the motor 1 is relatively large, current is supplied to the solenoid-driver 22 and the motor-driver 21 from the battery VBA in addition to the current from the power supply 30.

Figure 5:
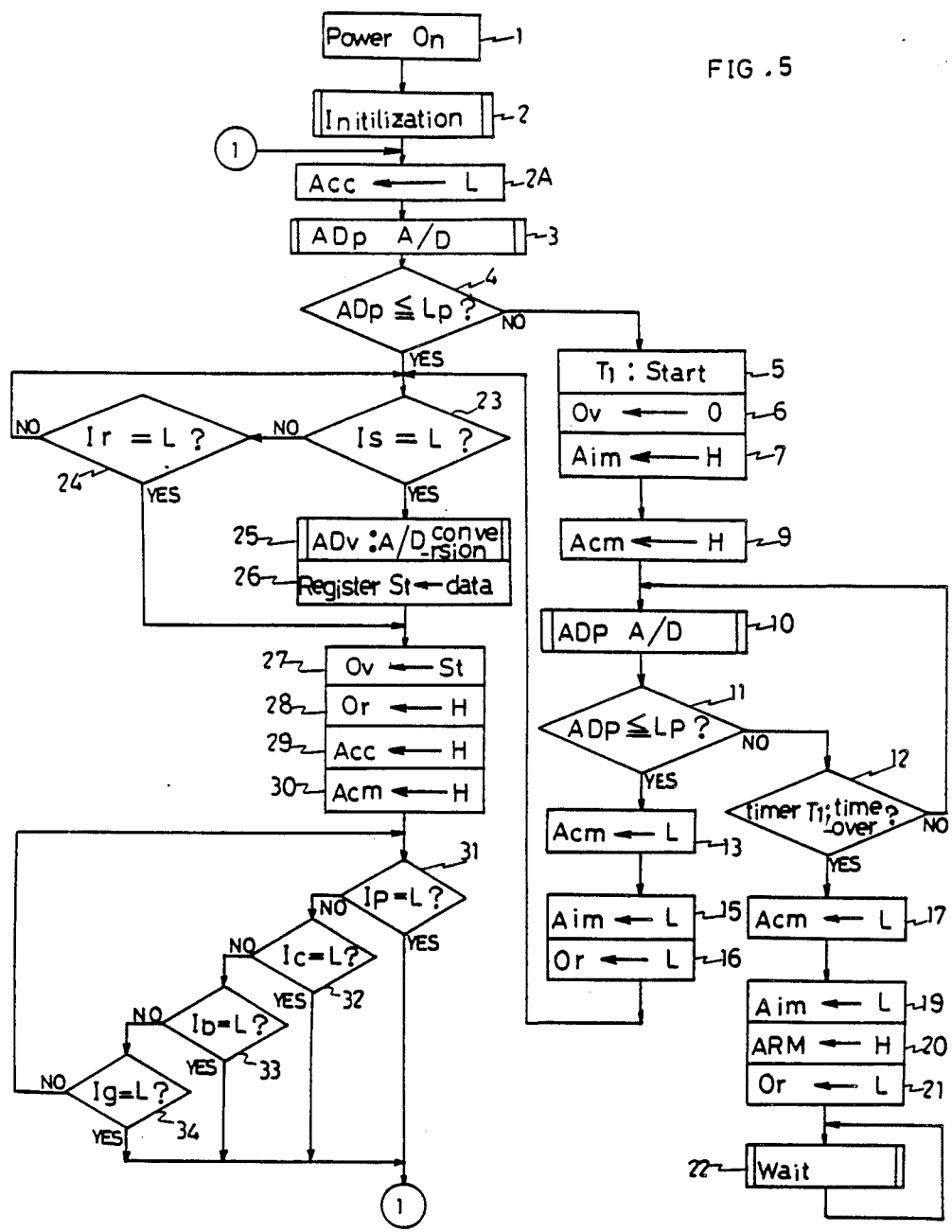
FIG. 5 is a flow-chart showing the operation of a micro-processor.

In FIG. 5, the operation of the micro-processor 20 is illustrated in the form of a flow-chart. The details are as follows.

(1) Initial Operation

Due to successive closures of the key switch EKS and the main switch 30, current is supplied to each component or circuit (step 1) and the micro-processor 20 is re-set to be ready for operation (step 2).

The microprocessor 20 outputs a low signal L from an output terminal Acc thereof for obtaining the on-condition of the clutch 5 (step 2A) and the input voltage corresponding to the rotating angle of the output shaft 12 is converted into digital signals (step 3). The resulting data represented by ADp is checked to see if it is less than Lp indicating the rotating angle of the output shaft 12 when the throttle valve 69 is at the idling position (step 4). That is to say, it is checked to see if the output shaft 12 is at an initial angle or position.

If ADp is not greater than Lp, this condition is in an adequate condition and the micro-processor 20 waits for the closure of the set switch Ss or the resume switch Sc (step 23 and step 24).

If ADp is less than Lp, a timer T1 starts (step 5). The micro-processor 20 outputs 0 which is slightly smaller than Lp to the D/A converter 23 and high signals Hs to ports Aim and Acm (steps 6, 7 and 9).

As a result in steps 7 and 9, the motor-driver 21 drives the motor 1 so that the output voltage of the potentiometer 16 may be equalized to the output voltage of the D/A convertor 23. The micro-processor 20 then reads the output voltage of the D/A converter 23 after digital-conversion and checks whether ADp becomes less than Lp or not (step 11). If not, the micro-processor 20 reads again the output voltage of the D/A converter 23 after checking to see if the timer T1 is not timed out (step 13).

When ADp becomes less than Lp, the rotating angle of the output shaft 12 is at a position corresponding to the idling position of the throttle valve 69. Thus, the micro-processor 20, under such an adequate waiting condition, outputs low signals Ls from terminals Acm and Aim to the motor-driver 21 for stopping the motor 1 (steps 13 and 15), indicates the release of the self-holding of the relay 29 to the relay-driver 27 by applying a low signal L to a terminal Or and waits the closure of the set switch Ss or the resume switch Sc (steps 23 and 24).

When time-out occurs under the condition that ADp is greater than Lp, the micro-processor 20 orders the stop of the motor 1 to the motor-driver 21 (steps 17 and 19), the illumination of the lamp 32 to the lamp-driver 31 (step 20), the release of the relay 29 to the relay-driver 27 (step 21) before the waiting condition (step 22).

(2) Cruise Control of the Vehicle at a Constant Speed

Upon closure of the set switch Ss or the resume switch Sr, the micro-processor 20 converts the output voltage of the F/V converter 24 into a digital signal (step 25) and writes the resulting data into a register St (step 26). That is to say, the actual speed of the vehicle is stored in the register St.

Next, the data in the register St is output into the D/A-converter 23 (step 27), the relay-driver 27 is ordered to turn relay 29 on (step 28), a high signal H is supplied to the solenoid-driver 22 for indicating the clutch-on condition (step 29) and a high signal H and a low signal L are supplied to the motor driver 21 from the terminals Acm and Aim of the micro-processor 20 respectively (step 30).

Thus, the D/A-converter 23 gives a voltage which corresponds to the required speed of the vehicle when the switch Ss is closed and the motor-driver 21 drives the motor 1 so that the output voltage of the F/V-converter 24 which represents the actual speed of the vehicle may be equalized to the output voltage of the A/D-converter 23 which represents the required speed of the vehicle. The magnitude of the current to be supplied to the motor 1 is determined as follows. If the actual speed or output of the F/V converter 24 is less than the required speed or output of the D/A-converter 23, the motor 1 is driven in the positive direction or the direction for opening the throttle valve 69. Current to be supplied to the motor 1 is in proportion to the deviation between the output voltage of the F/V converter 24 and output voltage of the D/A-converter 23, is in inverse proportion to the output of the potentiometer 16 and is in reverse proportion to the real-current value of the motor 1. On the other hand, if the actual speed or output of the F/V converter 24 is greater than the required speed or output of the D/A-converter 23, the motor 1 is driven in the negative direction or the direction for closing the throttle valve 69. Current to be supplied to the motor 1 is the same as mentioned-above.

It should be noted that the power supply 28 is connected to the battery VBA in series. Due to such driving of the motor 1, the output shaft 12 is rotated in the positive or negative direction, thereby varying the opening of the throttle valve 69 for equalizing the actual speed to the required speed.

During the above-mentioned control, the microprocessor 20 watches for the closure of the cancel switch Sc, the brake switch Sb or the clutch switch Sg or the opening of the main switch 30 or the engine-key switch EKS for recognizing the order for releasing the cruise control at a constant speed (steps 31–34).

It is noted that the opening of throttle valve 69 cannot be decreased by releasing the accelerator pedal 76 during energization of the coil 5 or the clutch-on condition under this control. When it is necessary to decrease the opening of throttle valve 69, it is achieved by closing the cancelling switch Sc, depressing the brake pedal (not shown), performing a gear-change for obtaining the clutch-off condition in the transmission, opening the main switch 30 or opening the engine-key switch EKS.

(3) Release of the Cruise Control or Driving the Vehicle at a Constant Speed Upon opening of the main switch 30 or the engine-key switch EKS, a low signal L is applied to the inlet port Ip of the micro-processor 20. In such a case or upon the closure of the cancelling switch Sc, the brake switch Sb or the clutch switch Sg (steps 31–34), the micro-processor 20 returns to step 2A. Then, the output shaft 12 is rotated to a position corresponding to the idling position of the throttle valve 69 (steps 3–12), the motor 1 is stopped (steps 13 and 15) and the relay 29 is released (step 16).

Thus, so long as the switches Sc, Sb and Sg can be normally operated, by closing any one of the switches, the output shaft 12 can be moved to the position corresponding to the idling position of the throttle valve 69 and the clutch (shown in FIG. 2) is brought into the off-condition, thereby separating the motor 1 from the throttle valve 69. Also, the relay 29 is released. Therefore, the throttle valve 69 can be driven by depressing or releasing the accelerator pedal 76.

When the cruise control for operating the vehicle at a constant speed cannot be released due to malfunction of switches Sc, Sb and Sg, by opening the main switch 30 or the engine-key switch EKS, the micro-processor 20 drives the output shaft 12 so as to bring the throttle valve to the position corresponding to the idling position (steps 3–12). When the output shaft 12 is positioned at the desired position, the motor 1 is stopped (steps 13 and 15) and the relay 29 is released (step 16).

Thus, when the cruise control for operating the vehicle at a constant speed is in operation, the power supply 28 is retained by closing the relay 29 during the movement of the output shaft 12 to the position corresponding to the idling position of the throttle valve 69. Thus, the movement of the output shaft 12 can be performed in spite of the opening of the main switch 30 or the engine-key switch EKS.

After termination of the cruise control at a constant speed by closing any one of the switches Sc, Sb and Sg, when the resume switch Sr is closed, a new control for operating the vehicle at a constant speed which is the same as the previously speed can be obtained.

Due to the closure of the switch Sr, the micro-processor 20 executes steps 24 to 27 for outputting the stored data in the register to the D/A-converter 23. Further, the cruise control for operating the vehicle at a constant speed is performed similar to the above-mentioned manner.

While the invention has been particularly shown and described with reference to preferred embodiment thereof, it will be understood by those skilled in the art that the foregoing and other changes in form and details can be made therein without departing from the spirit and scope of the invention.

What is claimed is:

1. An automatic vehicle cruise control system comprising:
   vehicle-speed determining means movable between an upper limit for a high speed of the vehicle and a lower limit for a low speed of the vehicle;
   motor means for moving the vehicle-speed determining means;
   speed-detecting means for detecting the actual speed of the vehicle;
   target-setting means for setting the required speed of the vehicle;
   motor driving means for driving the motor means in such manner that the actual speed can be equalized to the required speed;
   a main switch interposed between battery means and the motor driving means;
   switch-detecting means for detecting the opening of the main switch;
   switching means for assuring the electrical connection between the battery means and the motor driving means; and
   control means activating the switching means after the closure of the main switch and deactivating the switching means after movement of the vehicle-speed determining means to its lower limit by the motor means upon detection of the opening of the main switch by the switch-detecting means.

2. An automatic vehicle cruise control system according to claim 1 further comprising connecting means interposed between the motor means and the vehicle-speed determining means and including an accelerator pedal which transfers the vehicle-speed determining means from its lower limit to the upper limit while the motor means is out of use.

3. An automatic vehicle cruise control system according to claim 1 further comprising timer means which stops the motor means upon elapse of a set time.

4. An automatic vehicle cruise control system according to claim 3, wherein the switching means is brought into the waiting condition upon the stopping of the motor means by the timer means.

5. An automatic vehicle cruise control system according to claim 1, wherein the vehicle-speed determining means is a throttle valve.

* * * * *